(12) United States Patent
Schmidt et al.

(10) Patent No.: US 8,352,468 B2
(45) Date of Patent: Jan. 8, 2013

(54) TOP SEARCH HITS BASED ON LEARNED USER PREFERENCES

(75) Inventors: Edward T. Schmidt, San Francisco, CA (US); Gordon J. Freedman, Palo Alto, CA (US); Benjamin S. Phipps, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 188 days.

(21) Appl. No.: 12/829,190

(22) Filed: Jul. 1, 2010

(65) Prior Publication Data

US 2011/0252026 A1 Oct. 13, 2011

Related U.S. Application Data

(60) Provisional application No. 61/321,762, filed on Apr. 7, 2010.

(51) Int. Cl.
*G06F 7/00* (2006.01)
(52) U.S. Cl. ......... 707/727; 707/732; 707/765; 707/768
(58) Field of Classification Search .................. None
See application file for complete search history.

(56) References Cited

U.S. PATENT DOCUMENTS

| | | | |
|---|---|---|---|
| 7,092,936 B1 | 8/2006 | Alonso et al. | |
| 7,499,940 B1* | 3/2009 | Gibbs | 1/1 |
| 7,565,363 B2 | 7/2009 | Anwar | |
| 7,617,209 B2 | 11/2009 | Whitman et al. | |
| 2005/0086234 A1* | 4/2005 | Tosey | 707/100 |
| 2005/0223308 A1* | 10/2005 | Gunn et al. | 715/500 |
| 2006/0035632 A1* | 2/2006 | Sorvari et al. | 455/418 |
| 2006/0271524 A1 | 11/2006 | Tanne et al. | |
| 2007/0288456 A1* | 12/2007 | Aravamudan et al. | 707/5 |
| 2008/0154856 A1 | 6/2008 | Riise et al. | |

* cited by examiner

*Primary Examiner* — Debbie Le
*Assistant Examiner* — Anh Tai Tran
(74) *Attorney, Agent, or Firm* — Blakely, Sokoloff, Taylor & Zafman LLP

(57) ABSTRACT

At least certain embodiments of the present disclosure include a method to identify top hits in search result based on learned user preferences. In one embodiment, a user search query for records is received from a user. The user search query may contain an alphanumerical string. Records in a multifunctional device are searched to find those that match the alphanumerical string. Based on records previously selected by the user, records in the search result are ranked to identify one or more top hits for the user.

17 Claims, 9 Drawing Sheets

TOP HIT DATABASE 400

| CHOSEN RECORD | APP. | WT. | QUERY | | | | | | |
|---|---|---|---|---|---|---|---|---|---|
| JOHN DOE | CONTACT | 2 | 0 | 0 | 0 | ... | 2 | ... | 0 |
| JOHN DOWNS | CONTACT | 1 | 0 | 0 | 0 | 1 | 0 | ... 0 ... | 0 |

| CHOSEN RECORD | APP. | WT. | QUERY | | | | | | | | | |
|---|---|---|---|---|---|---|---|---|---|---|---|---|
| JOHN DOE | CONTACT | 2 | 0 | 0 | 0 | ... | 2 | ... | 0 | | | |
| JOHN DOWNS | CONTACT | 1 | 0 | 0 | 0 | 1 | 0 | ... | 0 | ... | 0 | |

TOP HIT DATABASE 400

FIG. 4

TOP SEARCH HITS BASED ON LEARNED USER PREFERENCES

RELATED APPLICATIONS

This application claims the benefit of U.S. Provisional Patent Application No. 61/321,762, filed on Apr. 7, 2010, which is herein incorporated by reference in its entirety.

FIELD OF THE DISCLOSURE

This disclosure relates to finding top hits within search result based on learned user preferences.

BACKGROUND OF THE DISCLOSURE

Conventionally, data of various types is stored in computing devices, ranging from desktop personal computers to portable personal devices, such as multifunctional cellular telephones, personal digital assistants, etc. To make it easier and more convenient for users of computing devices to access data on the computing devices, operating systems installed on the computing devices typically provide searching capabilities. A user of a computing device may enter a search query to look for records stored on the computing device that match the search query.

To make it easier for users to search, some conventional operating system further identifies top hits among records in search result. The top hits generally include records that are commonly chosen by users at large. However, every user may have one's own preferences in searching. For instance, on one hand, two users looking for the same record (e.g., "John Smith") may use different search queries (e.g., "Jo" and "Smith" respective). On the other hand, two users entering the same user search query (e.g., "Do") may be looking for different records (e.g., "Donald Smith" and "John Downs" respectively). Thus, the top hits identified in the above conventional approach may not be useful for every user.

SUMMARY OF THE DESCRIPTION

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

At least certain embodiments include an environment with a calling software component interacting with a called software component through an API. A method for operating through an API in this environment includes transferring one or more function calls, messages, other types of invocations or parameters via the API.

Some embodiments of the present disclosure include a method for finding top hits in search result based on learned user preferences. In one embodiment, a user search query for records is received from a user. The user search query may contain an alphanumerical string. Records in a multifunctional device are searched to find those that match the alphanumerical string. Based on records previously selected by the same user, records in the search result are ranked to identify one or more top hits for the user. The top hits identified are records more likely to be selected by the user from the records in the search result based on prior selections made by the user.

Some embodiments of the present disclosure include a method for tracking a user's selection of records to build a top hit database. In one embodiment, a user enters a search query, in response to which, a set of records are returned. The user selects a record out of the set of records. The user selection causes a top hit record associated with the record in a top hit database to be created, if not existed yet, or to be updated, if already in existence. The top hit record may include a weight to indicate a likelihood of the user selecting the record when the user searches using the search query.

Various devices which perform one or more of the foregoing methods and machine-readable media which, when executed by a processing system, cause the processing system to perform these methods, are also described.

Other methods, devices and machine-readable media are also described.

BRIEF DESCRIPTION OF THE DRAWINGS

The disclosure is described by way of example with reference to the accompanying drawings, wherein:

FIG. 4 illustrates one embodiment of a top hit database;

DETAILED DESCRIPTION

Figure 1:
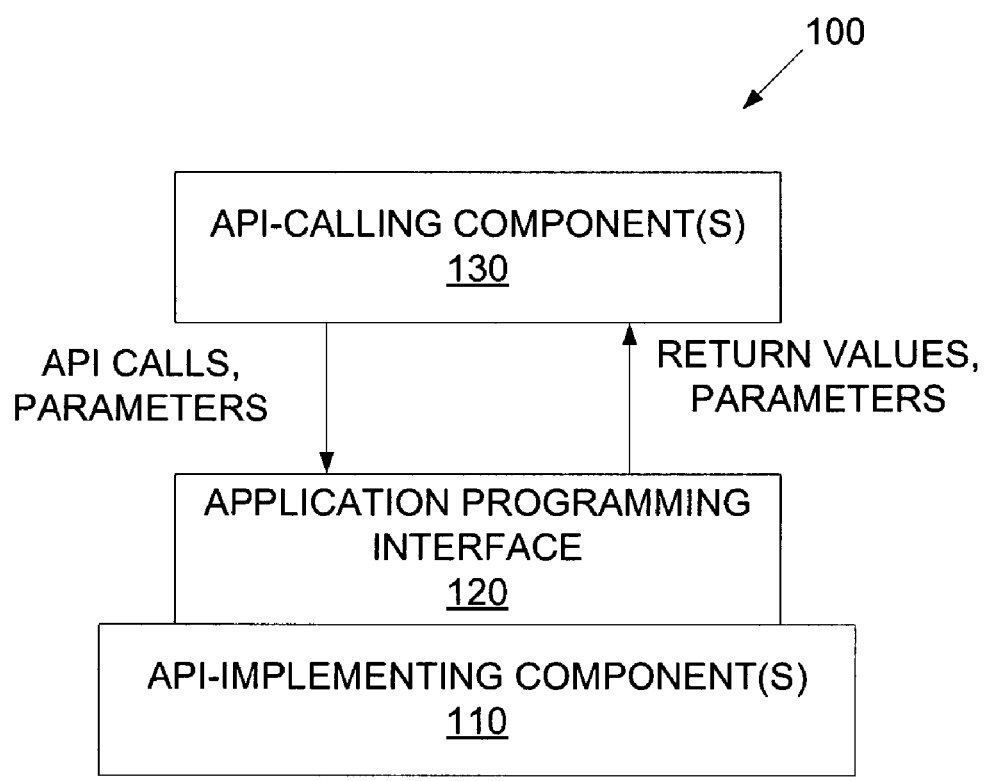
FIG. 1 illustrates a block diagram of an exemplary API architecture usable in some embodiments of the invention.

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a through understanding of various embodiments of the present disclosure. However, in certain instances, well-known or conventional details are not described in order to provide a concise discussion of embodiments of the present disclosure.

Some portions of the detailed descriptions, which follow, are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), flash memory, magnetic or optical cards, or any type of media suitable for storing electronic instructions, and each coupled to a bus.

A machine-readable medium includes any mechanism for storing or transmitting information in a form readable by a machine (e.g., a computer). For example, machines store and communicate (internally and with other devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.).

At least certain embodiments of the present disclosure include one or application programming interfaces in an environment with search software interacting with a software application. Various function calls or messages are transferred via the application programming interfaces between the search software and software applications. Transferring the function calls or messages may include issuing, initiating, invoking or receiving the function calls or messages. Example application programming interfaces transfer function calls to implement various operations (e.g., search, networking, service discovery, etc.) for a device having a display region. An API may also implement functions having parameters, variables, or pointers. An API may receive parameters as disclosed or other combinations of parameters. In addition to the APIs disclosed, other APIs individually or in combination can perform similar functionality as the disclosed APIs.

The display region may be in a form of a window. A window is a display region which may or may not have a border and may be the entire display region or area of a display. In some embodiments, a display region may have at least one window and/or at least one view (e.g., web, text, or image content). The methods, systems, and apparatuses disclosed can be implemented with display regions, windows, and/or views.

At least certain embodiments of the disclosure may be part of a portable electronic device, such as a digital media player (e.g., a portable music and/or video media player), which may include a media processing system to present the media, a storage device to store the media and may further include a radio frequency (RF) transceiver (e.g., an RF transceiver for a cellular telephone) coupled with an antenna system and the media processing system. In certain embodiments, data stored on a remote storage device may be transmitted to the portable electronic device through the RF transceiver. The data may be, for example, one or more of music or other audio, still pictures, or motion pictures, etc.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). In some embodiments, the display device and input device are integrated while in other embodiments the display device and input device are separate devices.

Embodiments of the disclosure described herein may be part of other types of data processing systems, such as, for example, entertainment systems or personal digital assistants (PDAs), or general purpose computer systems, or special purpose computer systems, or an embedded device within another device, or cellular telephones which do not include media players, or multifunctional touch tablet devices, or other multifunctional touch devices, or devices which combine aspects or functions of these devices (e.g., a media player, such as an iPod® portable media player, combined with a PDA, an entertainment system, and a cellular telephone in one device, an iPhone®). Because these devices generally have multiple functionalities, these devices may also be referred to as multifunctional devices hereinafter. In this disclosure, electronic devices and consumer devices are types of devices.

In some embodiments, a platform provides various search, service discovery, and networking operations. The platform includes hardware components and an operating system. The hardware components may include a processing unit coupled to an input panel and a memory coupled to the processor. The operating system includes one or more programs that are stored in the memory and configured to be executed by the processing unit. One or more programs include various instructions for transferring function calls or messages through an Application Programming Interface (API) in order to perform various search, service discovery, and networking operations.

One or more APIs may be used in some embodiments. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and pass data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments an application or other client program may use an API provided by an Application Framework. In these embodiments the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g. the provider of a software library) or creator of the another set of APIs.

FIG. 1 is a block diagram illustrating an exemplary API architecture, which may be used in some embodiments of the invention. As shown in FIG. 1, the API architecture 100 includes the API-implementing component 110 (e.g., an operating system, a library, a device driver, an API, an application program, software or other module) that implements the API 120. The API 120 specifies one or more functions, methods, classes, objects, protocols, data structures, formats and/or other features of the API-implementing component that may be used by the API-calling component 130. The API 120 can specify at least one calling convention that specifies how a function in the API-implementing component receives parameters from the API-calling component and how the function returns a result to the API-calling component. The API-calling component 130 (e.g., an operating system, a library, a device driver, an API, an application program, software or other module) makes API calls through the API 120 to access and use the features of the API-implementing component 110 that are specified by the API 120. The API-implementing component 110 may return a value through the API 120 to the API-calling component 130 in response to an API call.

It will be appreciated that the API-implementing component 110 may include additional functions, methods, classes, data structures, and/or other features that are not specified through the API 120 and are not available to the API-calling component 130. It should be understood that the API-calling component 130 may be on the same system as the API-implementing component 110 or may be located remotely and accesses the API-implementing component 110 using the API 120 over a network. While FIG. 1 illustrates a single API-calling component 130 interacting with the API 120, it should be understood that other API-calling components, which may be written in different languages (or the same language) than the API-calling component 130, may use the API 120.

The API-implementing component 110, the API 120, and the API-calling component 130 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 2:
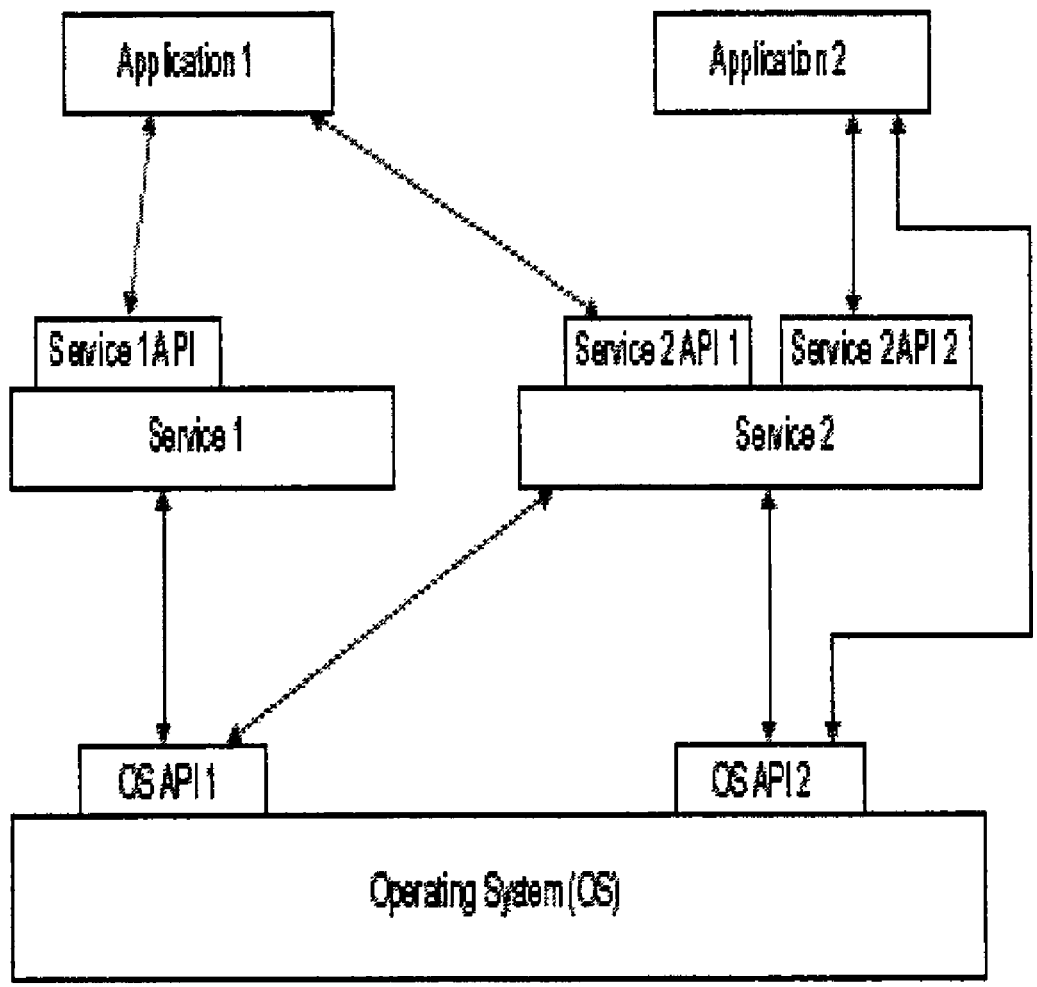
FIG. 2 is an exemplary embodiment of a software stack usable in some embodiments of the invention.

In FIG. 2 ("Software Stack"), an exemplary embodiment, applications can make calls to Services 1 or 2 using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 3:
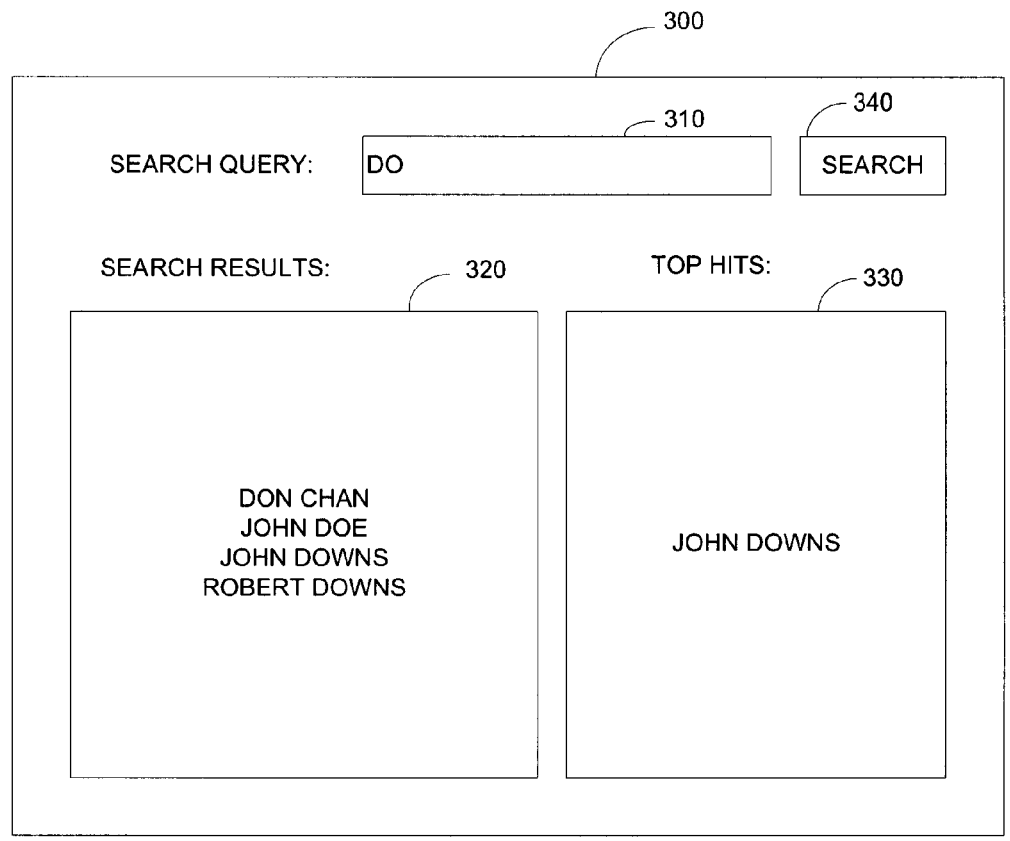
FIG. 3 illustrates one embodiment of a graphical user interface (GUI) to display results and top hits of a search.

FIG. 3 illustrates one embodiment of a graphical user interface (GUI) to display results and top hits of a search. The GUI 300 may be created by an application usable to search for records on a multifunctional device. The application may leverage one or more APIs to perform the search as discussed above. The GUI 300 includes a text field 310 for user entry of a user search query and a search button 340. The GUI 300 further includes a search result display region 320 and a top hit display region 330. Note that the arrangement of various components of GUI 300, as well as the designs and look of GUI 300 and its components, may vary in different embodiments.

In some embodiments, a user enters a user search query in text field 310 to search for records on the multifunctional device. Typically, the user search query includes an alphanumerical string (e.g., "Do," J," "P2," etc.). Then the user may actuate the search button 340 to submit the user search query to the application. For example, the user may tap onto a location of a touch screen displaying search button 340 to actuate search button 340.

In response to receiving the user search query, the application searches for records on the multifunctional device that match the user search query. For instance, the application may be an application for organizing contact information on the multifunctional device, and the application can search for records with names that include the alphanumerical string in the user search query. In the current example illustrated in FIG. 3, the user search query includes a string, "Do," and records on the multifunctional device having names that include "Do" are: Don Chan, John Doe, John Downs, and Robert Downs. The records with names matching the string of the user search query are displayed in search result display region 320. The user may select one or more individual records displayed in search result display region 320 for further processing. For instance, the user may select a record (such as John Doe in the current example) in order to place a telephone call at a telephone number associated with the record.

Furthermore, the application may examine selections associated with the user search query made by this user in the past in order to identify records that this user is now likely to select. In some embodiments, the application may access a top hit database stored on the multifunctional device, which stores information of records selected by this user and search queries associated with these selections. The application may further rank records in the current search result according to the information. All or some of the records ranked may be displayed in top hit display region 330 in the order of their respective rankings. For example, the record that is most likely to be selected by the user is displayed first in top hit display region 330, followed by the record second in ranking, and so forth. In some embodiments, top hit display region 330 may display only a predetermined number of records, such as the top three (3) records among all records in search result.

FIG. 4 illustrates one embodiment of a top hit database. The top hit database 400 is usable by an application to keep track of selections made by a user in search results of search queries submitted by the user. The information in the top hit database 400 may be used to identify records that are more likely to be selected by this particular user when entering a certain search query.

In some embodiments, the top hit database 400 includes a column of chosen records 410, a column of application 420, a column of weights 430, and a column for tracking user search queries associated with the chosen records (hereinafter, the "query column") 440. In some embodiments, each field under Query column 440 includes an array of twenty-six (26) entries to track the first letter of each user search query associated with the respective chosen record. In other words, the query column 440 has a one-letter resolution. In other embodiments, the array may be expanded to cover longer strings (e.g., the whole word) in user search queries.

The first time a record is chosen by the user in search results generated from a first user search query, the record does not exist in top hit database 400, and thus, the record is created as follows. The identifier or name of the record is entered into the top hit database 400 under chosen record column 410. The application associated with the chosen record is then entered under application column 420. A weight of one (1) is entered under weight column 430. A slot within the array under query column 440 corresponding to the first letter of the first user search query is set to one (1), while values in other slots of the array are initialized to be zero (0). The next time the record is chosen by the user in search results generated from a second user search query, which may or may not be the same as the first user search query, the record is updated in top hit search database 400. In some embodiments, the weight of this record is incremented by one (1) and the value in a slot of the array under query column 440 corresponding to a first letter in the second search query is also incremented by one (1). In other words, the weight and the values in the array indicate how often the user chooses the record when submitting various user search queries. Such history or statistics of user selection can be used to determine how likely the record is going to be selected by the user when the user submits a user search query. Details of some examples of updating and using records in top hit database 400 are discussed below.

Figure 5:
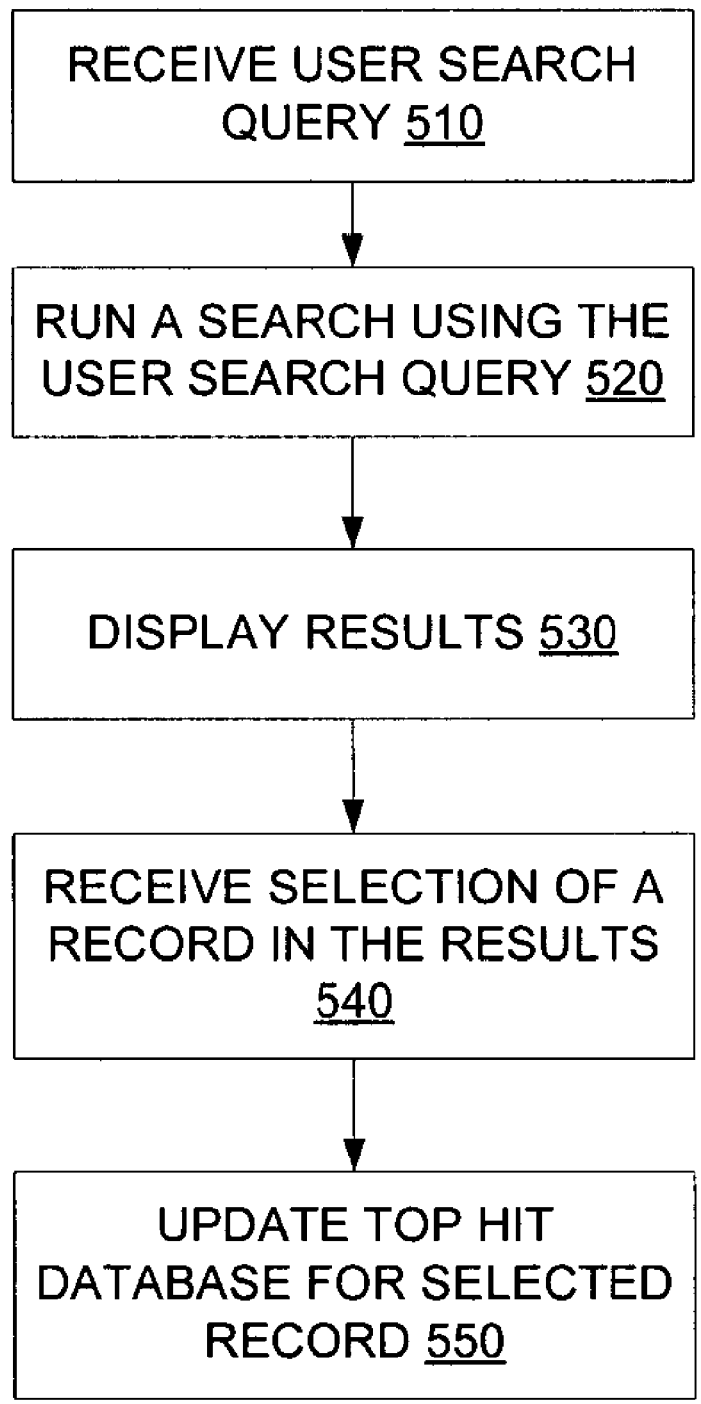
FIG. 5 is a flow chart of one embodiment of a method to build an exemplary top hit database.

FIG. 5 is a flow chart of one embodiment of a method to build an exemplary top hit database in a multifunctional device. The method may be performed by processing logic that includes hardware, software, firmware, or a combination of any of the above.

In some embodiments, processing logic receives a user search query from a user (processing block 510). In response, processing logic runs a search using the user search query to find records matching the user search query (processing block 520). Then processing logic displays result of the search, which may include a set of zero or more records (processing block 530). Assuming there is at least one record in the result, the user may select a record from the result to further act on it. Processing logic receives the user selection of the record (processing block 540). Furthermore, processing logic updates a top hit database, such as the one illustrated in FIG. 4, for the selected record (processing block 550). If a top hit record associated with the selected record already exists in the top hit database, processing logic may update a weight and a query array of the top hit record. Otherwise, processing logic may create a top hit record associated with the selected record in the top hit database.

Figure 6:
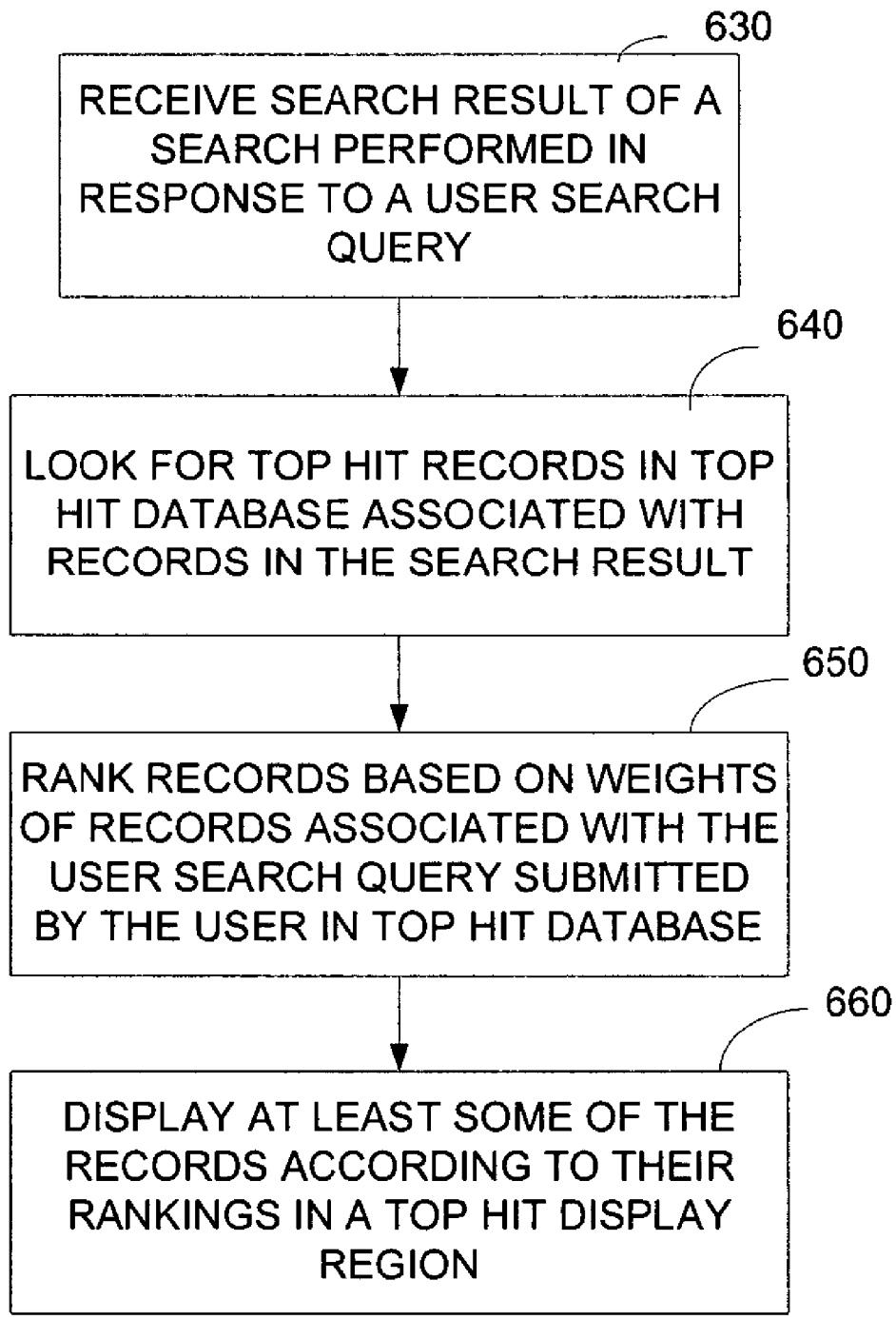
FIG. 6 is a flow chart of one embodiment of a method to generate top hits within a search result of a user search query.

FIG. 6 is a flow chart of one embodiment of a method to generate top hits within a search result of a user search query. The method may be performed by processing logic that includes hardware, software, firmware, or a combination of any of the above.

In some embodiments, processing logic receives search result of a search performed in response to a user search query (processing block 630). The search result may contain one or more records stored on a multifunctional device. Then processing logic may search a top hit database for top hit records associated with the records in the search result, such as top hit database 400 illustrated in FIG. 4 (processing block 640). As discussed above, the top hit database stores information on user selection of records with respect to search queries previously submitted by the same user. In some embodiments, the information in the top hit database includes weights for each record associated with various user search queries. Based on the weights of the records associated with the particular user search query currently submitted by the user, processing logic ranks the records in the search result (processing block 650). Then processing logic may display at least some of the records according to their rankings in a top hit display region, such as top hit display region 330 in FIG. 3 (processing block 660). To further illustrate the above concept of finding top search hits based on learned user preferences, one example is discussed in details below.

In the current example, a multifunctional device stores a set of records used by an application that organizes contact information for a user. The application is hereinafter referred to as a contact application. Each of the records includes a name of a person and contact information of that person (e.g., telephone number, electronic mail address, home address, etc.). In the current example, the records include names and contact information of the following people: Don Chan, John Doe, John Downs, and Robert Downs. The records can be searched by the names in the records. For example, the user may enter all or part of a name (e.g., "J," "Do," etc.) to search for records with names containing the name or partial name entered. As mentioned above, results of the search can be displayed in search result region 320 of GUI 300 illustrated in FIG. 3, and top hits in the search result can be displayed in top hit region 330 of GUI 300 illustrated in FIG. 3.

Initially, the user may enter "J" to search for records with names containing the letter "J." Because this is the first time the user searches for records on the multifunctional device, there is no prior search history of the user, and thus, no top hit is found. Only the search result, which includes John Doe and John Downs, are displayed in search result region 320. Suppose the user selects John Doe from the search result. Then a record of John Doe is created in a top hit database (such as top hit database 400 illustrated in FIG. 4) in response to the user selection. Because the first letter of the user search query entered is "J," the value in a slot in the array under a query column (such as column 440 in FIG. 4) corresponding to the letter "J" is set to one (1), while the values in the remaining slots in the array are set to zero (0). A weight of one (1) is also assigned to the record of John Doe in the top hit database.

Later, the user may repeat the search by enter "J" as a user search query. Again, a search result containing John Doe and John Downs is returned and displayed in search result region 320. Because there is prior search history of the user, top hit among the search result may be determined. Specifically, the top hit database is checked for records corresponding to the records in the search result. In the current example, there is no record of John Downs in the top hit database, but there is a record of John Doe in the top hit database. Furthermore, the record of John Doe in the top hit database has a weight of 1 associated with a user search query beginning with "J." Thus, John Doe is returned as a top hit record in top hit region 330. Suppose the user selects John Doe again, from either search result region 320 or top hit region 330. In response to the user selection, the record of John Doe in the top hit database is updated. Specifically, the value in the slot of the array under the query column is incremented by one (1), resulting in a value of two (2). The weight associated with the record of John Doe is also increased to two (2).

Later, the user searches for contact records again and enters a search query of "Do." A search result containing Don Chan, John Doe, John Downs, and Robert Downs is displayed in search result region 330. Because only a record of John Doe exists in the top hit database, John Doe is identified as the top hit among the records in the search result, and thus, is displayed in top hit region 340. Suppose the user selects John Downs in search result region 330, but not John Doe. In response to the user selection, a record of John Downs is created in the top hit database. A value in the fourth slot in the array under the query column, which corresponds to the letter "D," is set to one (1), while values in the remaining slots of the array are set to zero (0), because the selection of John Downs is associated with the user search query beginning with "D." A weight of one (1) is assigned to the record of John Downs in the top hit database.

When the user searches again using a search query, "Do," a search result containing Don Chan, John Doe, John Downs, and Robert Downs is again displayed in search result region 330. Furthermore, the top hit database is checked for records associated with the names in the search result. Because there is no record of Don Chan and Robert Downs in the top hit database, they are not displayed in top hit region 330. Because the records of both John Doe and John Downs are found in the top hit database, both records are evaluated to rank them with respect to the current user search query (i.e., "Do"). The values of the fourth slot (which corresponds to the first letter of the user search query, "D") of the array under query column in the records of John Doe and John Downs are 0 and 1, respectively. Thus, John Downs is ranked higher than John Doe with respect to the current user search query. As such, John Downs is displayed as the first top hit record in top hit region 330, followed by John Doe. Note that even though John Doe has been selected twice and John Downs has been selected only once by the user, John Downs is ranked higher in top hit region 330 because the user previously selected John Downs, instead of John Doe, when the user searched using the user search query "Do." In other words, the above approach selects a record that is more likely to be chosen by the user with respect to the current user search query entered based on a history of the user's selection.

Figure 7:
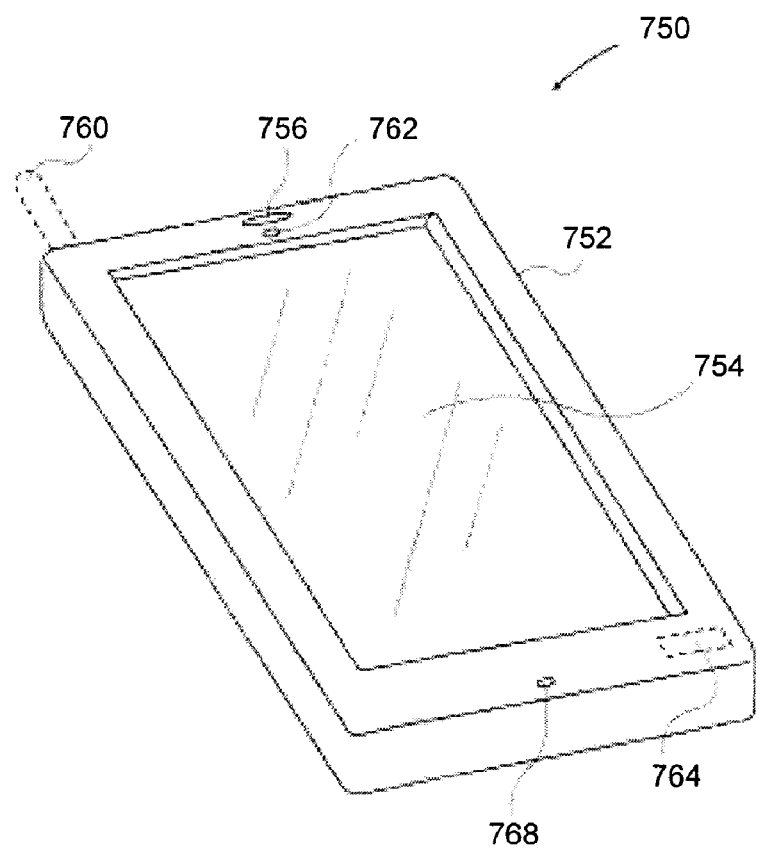
FIG. 7 is a perspective view of a device in accordance with one embodiment of the present disclosure.
Figure 8:
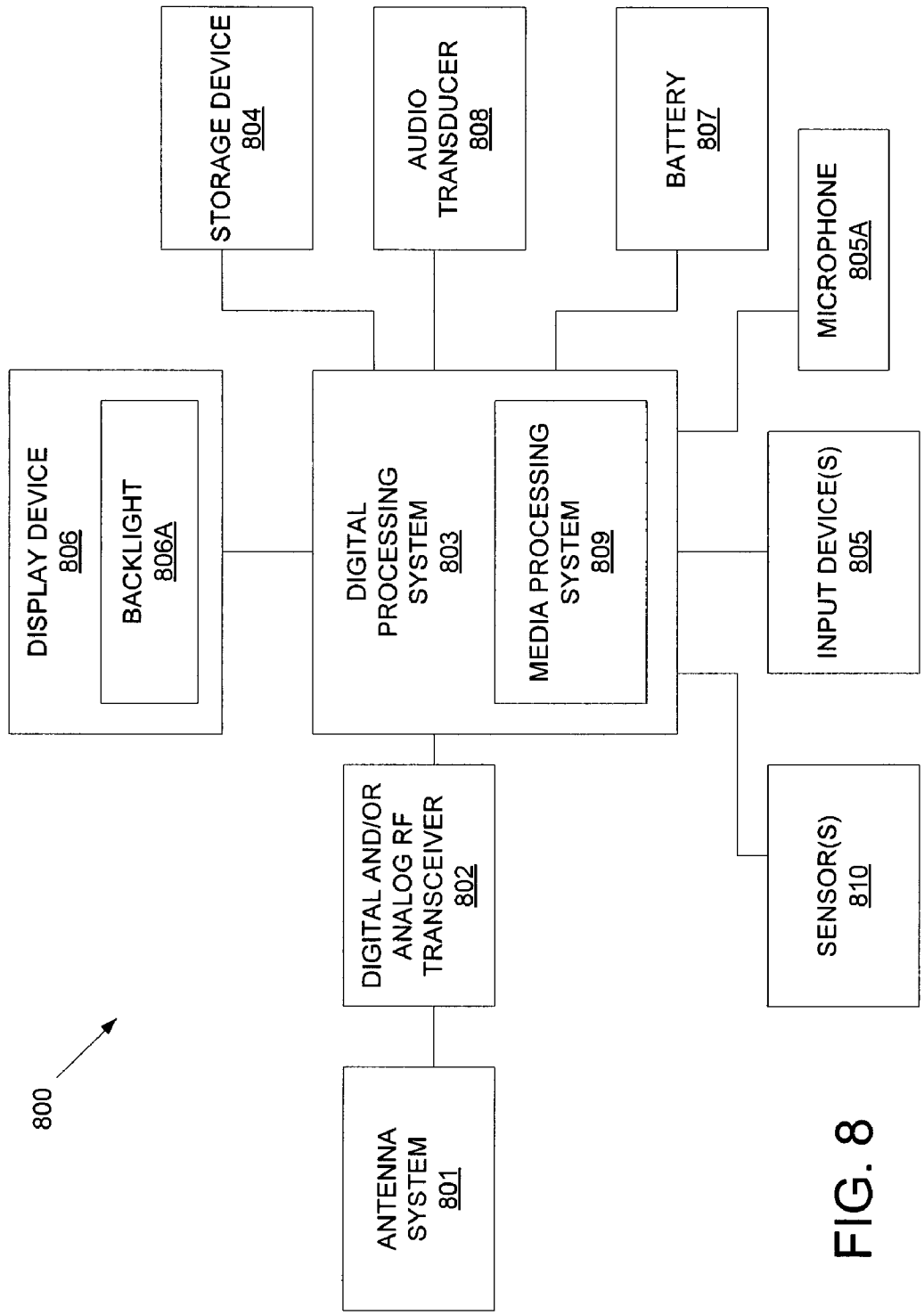
FIG. 8 shows an embodiment of a wireless device which includes the capability for wireless communication.
Figure 9:
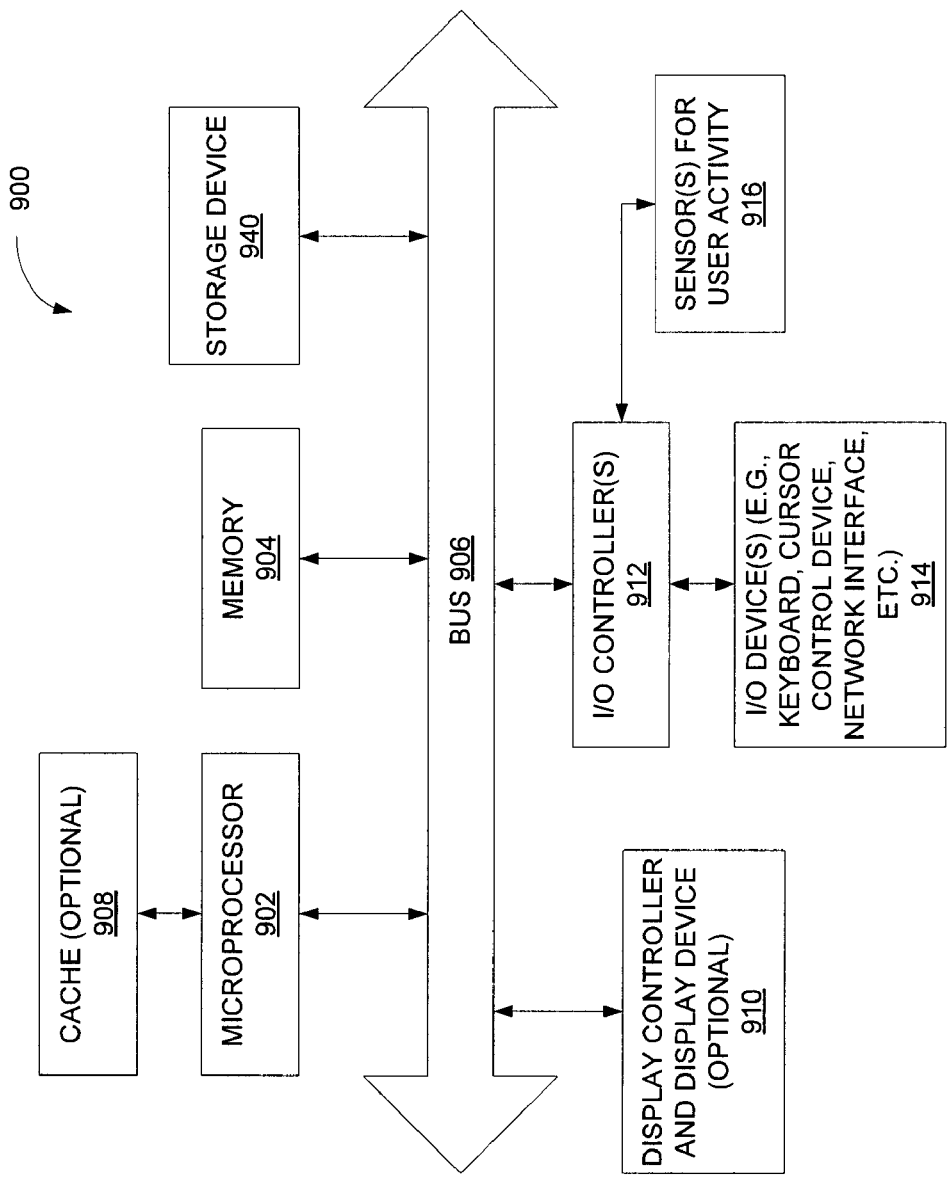
FIG. 9 shows another example of a device in accordance with one embodiment of the present disclosure.

In some embodiments, the methods, systems, and apparatuses of the present disclosure can be implemented in various devices including electronic devices, consumer devices, data processing devices, desktop computers, portable computers, wireless devices, cellular devices, tablet devices, handheld devices, multi touch devices, multi touch data processing devices, any combination of these devices, or other like devices. FIGS. 7-9 illustrate examples of a few of these devices.

FIG. 7 shows a device 750 in accordance with one embodiment of the disclosure. The device 750 may include a housing 752, a display/input device 754, a speaker 756, a microphone 758 and an optional antenna 760 (which may be visible on the exterior of the housing or may be concealed within the housing). The device 750 also may include a proximity sensor 762 and an accelerometer 764. The device 2950 may be a cellular telephone or a device which is an integrated PDA and a cellular telephone or a device which is an integrated media player and a cellular telephone or a device which is both an entertainment system (e.g. for playing games) and a cellular telephone, or the device 750 may be other types of devices described herein. In one particular embodiment, the device 750 may include a cellular telephone and a media player and a PDA, all contained within the housing 752. The device 750 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer, an iPhone®, and an iPod® are portable devices.

In certain embodiments of the present disclosure, the device 750 can be used to implement at least some of the methods discussed in the present disclosure.

FIG. 8 shows an embodiment of a wireless device which includes the capability for wireless communication. Wireless device 800 may include an antenna system 801. Wireless device 800 may also include a digital and/or analog radio frequency (RF) transceiver 802, coupled to the antenna system 801, to transmit and/or receive voice, digital data and/or media signals through antenna system 801.

Wireless device 800 may also include a digital processing system 803 to control the digital RF transceiver and to manage the voice, digital data and/or media signals. Digital processing system 803 may be a general purpose processing device, such as a microprocessor or controller for example. Digital processing system 803 may also be a special purpose processing device, such as an ASIC (application specific integrated circuit), FPGA (field-programmable gate array) or DSP (digital signal processor). Digital processing system 803 may also include other devices, as are known in the art, to interface with other components of wireless device 800. For example, digital processing system 803 may include analog-to-digital and digital-to-analog converters to interface with other components of wireless device 800. Digital processing system 803 may include a media processing system 809, which may also include a general purpose or special purpose processing device to manage media, such as files of audio data.

Wireless device 800 may also include a storage device 804, coupled to the digital processing system, to store data and/or operating programs for the Wireless device 800. Storage device 804 may be, for example, any type of solid-state or magnetic memory device. Storage device 804 may be or include a machine-readable medium.

Wireless device 800 may also include one or more input devices 805, coupled to the digital processing system 803, to accept user inputs (e.g., telephone numbers, names, addresses, media selections, etc.) Input device 805 may be, for example, one or more of a keypad, a touchpad, a touch screen, a pointing device in combination with a display device or similar input device.

Wireless device 800 may also include at least one display device 806, coupled to the digital processing system 803, to display information such as messages, telephone call information, contact information, pictures, movies and/or titles or other indicators of media being selected via the input device 805. Display device 806 may be, for example, an LCD display device. In one embodiment, display device 806 and input device 805 may be integrated together in the same device (e.g., a touch screen LCD such as a multi-touch input panel which is integrated with a display device, such as an LCD display device). The display device 806 may include a backlight 806A to illuminate the display device 806 under certain circumstances. It will be appreciated that the Wireless device 800 may include multiple displays.

Wireless device 800 may also include a battery 807 to supply operating power to components of the system including digital RF transceiver 802, digital processing system 803, storage device 804, input device 805, microphone 805A, audio transducer 808, media processing system 809, sensor(s) 810, and display device 806. Battery 807 may be, for example, a rechargeable or non-rechargeable lithium or nickel metal hydride battery. Wireless device 800 may also include audio transducers 808, which may include one or more speakers, and at least one microphone 805A. In certain embodiments of the present disclosure, the wireless device 800 can be used to implement at least some of the methods discussed in the present disclosure.

FIG. 9 shows another example of a device according to an embodiment of the disclosure. This device 900 may include a processor, such as microprocessor 902, and a memory 904, which are coupled to each other through a bus 906. The device 900 may optionally include a cache 908, which is coupled to the microprocessor 902. The device may optionally include a storage device 940 which may be, for example, any type of solid-state or magnetic memory device. Storage device 940 may be or include a machine-readable medium.

This device may also optionally include a display controller and display device 910, which is coupled to the other components through the bus 906. One or more input/output controllers 912 are also coupled to the bus 906 to provide an interface for input/output devices 914 and to provide an interface for one or more sensors 916 which are for sensing user activity. The bus 906 may include one or more buses connected to each other through various bridges, controllers, and/or adapters as are well known in the art. The input/output devices 914 may include a keypad or keyboard or a cursor control device such as a touch input panel. Furthermore, the input/output devices 914 may include a network interface, which is either for a wired network or a wireless network (e.g. an RF transceiver). The sensors 916 may be any one of the sensors described herein including, for example, a proximity sensor or an ambient light sensor. In at least certain implementations of the device 900, the microprocessor 902 may receive data from one or more sensors 916 and may perform the analysis of that data in the manner described herein.

In certain embodiments of the present disclosure, the device 900 can be used to implement at least some of the methods discussed in the present disclosure.

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory machine-readable storage medium that provides instructions that, if executed by a processor, will cause the processor to generate an application programming interface (API) that allows an API-implementing component to perform operations, the operations comprising:
   receiving a user search query for records stored in a multifunctional device from a user, the user search query including an alphanumerical string comprising a first character;
   searching in the multifunctional device for records that match the alphanumerical string;
   searching in a top hit database for records corresponding to the records that match the alphanumerical string, the top hit database records being records selected by the user from results of prior user search queries, wherein the prior user search queries included alphanumerical strings comprising first characters, each top hit database record comprising a weight and an incremental value for the first characters of the prior user search queries the top hit database record was selected from; and
   ranking the records that match the alphanumerical string based on the weights of the corresponding top hit database records and the incremental values of the corresponding top hit database records corresponding to the first character of the user search query.

2. The non-transitory machine-readable storage medium of claim 1, wherein ranking the records that match the alphanumerical string comprises
   comparing the weights and the incremental values of the top hit database records corresponding to the records that match the alphanumerical string, wherein the weights and the incremental values are associated with the user and the user search query.

3. The non-transitory machine-readable storage medium of claim 2, wherein the alphanumerical string comprises a word having a first letter and wherein an incremental value is assigned to a top hit database record for a first character that matches the first letter.

4. The non-transitory machine-readable storage medium of claim 2, wherein ranking the records that match the alphanumerical string comprises:
   sorting the records that match the alphanumerical string by the weights of top hit database records corresponding to the records; and
   displaying a top hit database record with the greatest weight alongside the records that match the alphanumerical string.

5. The non-transitory machine-readable storage medium of claim 2, wherein the operations further comprise:
   entering, in response to the user selecting a record that matches the alphanumerical string but does not have a corresponding top hit database record, the record that matches the alphanumeric string into the top hit database and associating the entered top hit database record with the user search query.

6. A computer-implemented method, comprising:
   receiving from a user a selection of a record from a search result comprising a plurality of records found in a multifunctional device, wherein the search result has been generated in response to a user search query input to the multifunctional device, the user search query including an alphanumerical string comprising a first character; and
   updating a top hit database record corresponding to the selected record in a top hit database associated with the user, the top hit database stored in the multifunctional device, the updating comprising changing a weight of the top hit database record and incrementing an incremental value of the top hit database record for the first character of the user search query.

7. The method of claim 6, wherein the weight indicates a likelihood of the record being selected by the user when the user searches using the user search query.

8. The method of claim 6, further comprising:
   associating the top hit database record with at least part of the user search query.

9. The method of claim 8, wherein the part of the user search query associated with the top hit database record includes the first character of the user search query.

10. A computer-implemented method, comprising:
    storing a top hit database on a multifunctional device, the top hit database comprising a plurality of top hit database records associated with a user of the multifunctional device, wherein the plurality of top hit database records have been created and updated based on the user selecting records from search results presented by the multifunctional device in response to prior user search queries having alphanumerical strings comprising first characters wherein each top hit database record comprises a weight and an incremental value for a first character of a prior user search query the top hit database record was selected from; and
    ranking a plurality of records in a search result generated in response to a current user search query entered by the user, the current user search query including an alphanumerical string comprising a first character, the ranking based on the weights and incremental values associated with a plurality of top hit database records corresponding to the plurality of records in the search result.

11. The method of claim 10, wherein each top hit database record includes a record previously chosen by the user, an application associated with the record, a weight, and a data structure for tracking user search queries associated with the top hit database record, wherein the data structure includes an incremental value.

12. The method of claim 11, wherein the data structure includes an array of twenty-six entries to track a first letter of each of the prior user search queries the top hit database record was selected from, wherein the entries correspond to incremental values.

13. The method of claim 12, further comprising:
    Incrementing, in response to the user selecting a record after searching with the current user search query, an incremental value in a respective entry associated with the first character of the current user search query, the respective entry being in the array of the top hit database record corresponding to the selected record.

14. A computer-implemented method, comprising:
  learning a preference of a user of a multifunctional device in record selection from search results, the learning comprising:
    keeping track of records previously selected by the user from search results generated in response to prior search queries entered by the user, the keeping track comprising:
      storing the records previously selected by the user in a top hit database, which comprises a weight column and a query column having a one-letter resolution; and
      updating the query column based on a first letter of each of the prior user search queries;
    associating the selected records with their respective prior user search queries; and
  presenting, via the multifunctional device, a plurality of records found in the multifunctional device in response to a current search query submitted by the user, the current user search query including an alphanumerical string comprising a first character, the plurality of records presented in an order based on the learned preference of the user.

15. The method of claim 14, wherein presenting the plurality of records found using the current user search query in the order based on the learned preference of the user comprises:
  first presenting a record of the plurality of records found that has been most frequently selected by the user when the user has previously entered search queries having a first letter that matches the first character.

16. An apparatus, comprising:
  a digital processing system to learn preference of a user in record selection from search results generated on a multifunctional device, wherein the digital processing system keeps track of records selected by the user from search results generated in response to prior search queries entered by the user into the multifunctional device and associates the selected records with their respective prior user search queries;
  a storage device to store a top hit database comprising a weight column and a query column having a one-letter resolution, wherein the records previously selected by the user are stored in the top hit database and the query column is updated based on a first letter of each of the prior user search queries; and
  a display device to display a plurality of records found in the multifunctional device using a current search query submitted by the user into the multifunctional device, the current user search query including an alphanumerical string comprising a first character, the plurality of records displayed in an order based on the learned preference of the user.

17. The apparatus of claim 16, wherein the display device first presents a record of the plurality of records found that has been most frequently selected by the user when the user has previously entered search queries having a first letter that matches the first character.

* * * * *